(12) United States Patent
Vichniakov et al.

(10) Patent No.: US 11,618,222 B2
(45) Date of Patent: Apr. 4, 2023

(54) METHOD AND INSERT FOR WELDING THERMOPLASTIC COMPONENTS

(71) Applicant: Airbus Operations GmbH, Hamburg (DE)

(72) Inventors: Alexei Vichniakov, Hamburg (DE); Alexander Keck, Hamburg (DE); Lennart Finger, Hamburg (DE); Remo Hinz, Hamburg (DE); Filipp Köhler, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/285,003

(22) PCT Filed: Oct. 15, 2019

(86) PCT No.: PCT/EP2019/077991
§ 371 (c)(1),
(2) Date: Apr. 13, 2021

(87) PCT Pub. No.: WO2020/079010
PCT Pub. Date: Apr. 23, 2020

(65) Prior Publication Data
US 2021/0387424 A1    Dec. 16, 2021

(30) Foreign Application Priority Data
Oct. 15, 2018    (DE) .......................... 102018217586.1

(51) Int. Cl.
*B29C 65/20*    (2006.01)
*B29C 65/22*    (2006.01)
(Continued)

(52) U.S. Cl.
CPC ........ *B29C 65/2038* (2013.01); *B29C 65/223* (2013.01); *B29C 65/228* (2013.01);
(Continued)

(58) Field of Classification Search
CPC ..... B29C 65/22; B29C 65/221; B29C 65/224; B29C 65/229; B29C 65/3444;
(Continued)

(56) References Cited

U.S. PATENT DOCUMENTS 3,480,505 A * 11/1969 Donnell, Jr. et al. ........................
B29C 66/8185
219/545
3,769,124 A   10/1973 Johnson
(Continued)

FOREIGN PATENT DOCUMENTS

DE         1136814 A    9/1962
DE    102009047671 A1    6/2011
(Continued)

OTHER PUBLICATIONS

Machine translation of JP 57070612 date uknown.*
German Search Report; priority document.
International Search Report; priority document.

*Primary Examiner* — John L Goff, II
(74) *Attorney, Agent, or Firm* — Greer, Burns & Crain, Ltd.

(57) ABSTRACT

A method for welding thermoplastic components, in particular, thermoplastic fiber composite structural components for an aircraft or spacecraft, having the following steps. Arranging an insert, which has a conductor structure having a plurality of parallel electrical conductor elements, in a joining zone between a first thermoplastic component and a second thermoplastic component such that at least some portions of the parallel electrical conductor elements are located in the joining zone; locally melting the components in the region of the joining zone by supplying current to the conductor structure; disconnecting the connector elements; and removing the insert from the joining zone by pulling out the disconnected conductor elements. An insert for the (Continued)

resistance welding of thermoplastic components is also provided.

17 Claims, 7 Drawing Sheets

(51) Int. Cl.
  *B29C 65/00* (2006.01)
  *B29L 31/30* (2006.01)
(52) U.S. Cl.
  CPC .......... *B29C 66/1122* (2013.01); *B29C 66/71* (2013.01); *B29C 66/721* (2013.01); *B29C 66/73921* (2013.01); *B29L 2031/3076* (2013.01); *B29L 2031/3097* (2013.01)
(58) Field of Classification Search
  CPC .............. B29C 65/3448; B29C 65/342; B29C 65/3432; B29C 65/3476; B29C 65/2038; B29C 65/223; B29C 65/228; B29C 65/20; B29C 65/226; B29C 65/344; B29C 65/348; B29C 66/71; B29C 66/721; B29C 66/73921; B29C 66/43; B29L 2031/3076; B29L 2031/3097; C09J 5/10

USPC ...................................................... 156/273.9
See application file for complete search history.

(56) References Cited

U.S. PATENT DOCUMENTS

| | | |
|---|---|---|
| 6,344,107 B1 | 2/2002 | Tashiro et al. |
| 7,126,096 B1 * | 10/2006 | Matsen .................. B29C 65/34 |
| | | 219/645 |
| 2006/0207985 A1 * | 9/2006 | Kaneko ................. B29C 65/222 |
| | | 219/243 |
| 2007/0034623 A1 | 2/2007 | Mimken |
| 2012/0153688 A1 * | 6/2012 | Gerken .................... H05B 3/34 |
| | | 297/180.12 |
| 2013/0149501 A1 | 6/2013 | Pacchione et al. |

FOREIGN PATENT DOCUMENTS

| | | | |
|---|---|---|---|
| EP | 1099533 A1 | 5/2001 | |
| JP | 57070612 A * | 5/1982 | .......... B29C 65/342 |
| WO | 2007016152 A2 | 2/2007 | |

\* cited by examiner

METHOD AND INSERT FOR WELDING THERMOPLASTIC COMPONENTS

CROSS-REFERENCES TO RELATED APPLICATIONS

This application claims the benefit of the International Application No. PCT/EP2019/077991, filed on Oct. 15, 2019, and of the German patent application No. 102018217586.1 filed on Oct. 15, 2018, the entire disclosures of which are incorporated herein by way of reference.

FIELD OF THE INVENTION

The present invention relates to a method for welding thermoplastic components, in particular, thermoplastic fiber composite structural components for an aircraft or spacecraft, and also to an insert for the resistance welding of thermoplastic components, in particular, by means of such a method.

Although the present invention, and also the problem on which it is based, will be described in more detail below in relation to the planar welding of thermoplastic fiber composite structural components for aircraft or spacecraft, it is not restricted thereto but rather is applicable to various thermoplastic components.

BACKGROUND OF THE INVENTION

Sometimes, thermoplastic components to be welded in a planar manner are often welded in a static process using a heating element. This is generally a conductive grid or woven fabric which is inserted between the components and which remains in the joining zone after the welding operation. By way of example, DE 10 2009 047 671 A1 describes a metal foil provided with anchoring portions which is to be introduced between a thermoplastic structural component and a thermoplastic fiber composite component, and welding of the fiber composite component to the structural component after the insertion of the metal foil, wherein the anchoring portions extend into the respectively associated component.

SUMMARY OF THE INVENTION

Against this background, the present invention is based on an object of specifying an improved method for welding thermoplastic components.

Accordingly, a method for welding thermoplastic components, in particular thermoplastic fiber composite structural components for an aircraft or spacecraft, is provided. The method comprises the following steps of: arranging an insert, which has a conductor structure having a multiplicity of parallel electrical conductor elements, in a joining zone between a first thermoplastic component and a second thermoplastic component, such that the parallel electrical conductor elements are at least partially located in the joining zone; locally melting the components in the region of the joining zone by way of energization of the conductor structure; separating the conductor elements; and removing the insert from the joining zone by pulling out the separated conductor elements.

In addition, an insert for the resistance welding of thermoplastic components, in particular, by means of a method according to the invention, is provided. The insert comprises: a multiplicity of parallel electrical conductor elements with a common longitudinal direction; a first transverse connection at a first longitudinal end and a second transverse connection at a second longitudinal end of the conductor elements; and a predetermined separation point on each conductor element, the separation point being configured for separation of the conductor element as a result of a tensile force which is applied to at least one of the transverse connections.

The idea on which the present invention is based is that of removing an insert, also referred to as an inlay, which is provided for introduction of the heat required for welding into the joining zone, from the joining zone after the melting of the material in the joining zone, in particular, still in a molten state of the material. According to the invention, a multiplicity of conductor elements which run parallel to one another and which are separated in a predetermined manner after the melting operation, are provided for this purpose. The separated conductor elements can then be pulled, in particular, laterally, out of the joining zone.

Advantageously, it is thus the case that no insert material which is no longer required after the welding operation remains in the joining zone. In this way, the mechanical properties of the joining zone are improved. In this case, corrosion aspects are also eliminated, and internal stresses as a result of thermal expansion and also influences on lightning conduction properties are avoided.

The lengths and cross sections of the conductor elements can be adapted in a variable manner, in particular with regard to the geometry of the components to be joined. By way of example, a corresponding design of the conductor elements makes it possible to control the welding energy introduced.

Preferably, the conductor elements have an insulating coating, and therefore a short circuit with any fibers embedded in the thermoplastic material is avoided, and thus a problem-free use in the case of fiber-reinforced thermoplastic components, in particular, even in the case of conductive fibers, is made possible. In addition, in one development, there is the possibility of the insulating coating being provided so as to be locally thicker in an edge region of the joining zone and/or in any region of the conductor elements that protrudes beyond the joining zone, than in a center of the joining zone. In this way, the so-called edge effect, which is understood to mean local overheating at the edge of a joining zone, is avoided or minimized.

According to the invention, the typical advantages of the resistance welding process for thermoplastic components are, in this case, maintained, for example the efficient and rapid input of heat directly into the joining zone, which results in relatively low thermal loading and deformation of the components to be joined.

The thermoplastic components may, for example, comprise thermoplastic fiber composite materials with a thermoplastic matrix system. By way of example, highly heat-resistant plastics such as polyetherketones (PEK), for example polyetheretherketone (PEEK), polyetherketoneketone (PEKK), polyaryletherketone (PAEK), or else polyphenylene sulfide (PPS), are suitable for the application in the case of structural components for aircraft or spacecraft.

According to the invention, it is, in particular, possible to realize automatic process control of the welding process, because at the point in time when the conductor element is separated, the flow of current is also automatically interrupted and the joining zone begins to cool down. Preferably, the separated conductor elements are pulled out of the joining zone while the thermoplastic material is still in molten form, that is to say, before the temperature sinks below the melting point, and thus the insert is removed.

After the removal of the insert from the joining zone, the joining zone can be subjected to a final consolidation, in particular by means of a pressure which presses the components together.

Advantageous refinements and developments will emerge from the further dependent claims and from the description with reference to the figures.

According to an advantageous development, the conductor elements are separated by way of application of a tensile force to the conductor elements. The conductor elements can thus be separated and pulled out in a common step. As an alternative or in addition to the tensile force, the separation can also be performed or assisted in an electrical manner, for example by way of a current surge which leads to separation of the conductor element.

According to an advantageous embodiment, the conductor elements are configured in each case to be elongate and to be straight along a common longitudinal direction. The application of the tensile force and the pulling-out operation are correspondingly performed in the longitudinal direction. In this way, the pulling-out operation is simplified, and influencing of the joining zone is minimized as a result.

According to one embodiment, the conductor structure, at the two longitudinal ends of the conductor elements, has a respective transverse connection which is arranged outside or at the edge of the joining zone. The separating operation, in this case, comprises severing at least a portion of each of the conductor elements from one of the transverse connections. A conductor structure is thus understood to mean an arrangement of electrical conductor elements which run in a parallel manner in the longitudinal direction and electrically conductive transverse connections which run transversely thereto. In this way, it is possible for the conductor elements to be collectively energized in a simple manner and, also, for a tensile force to be applied collectively to the conductor elements for the purposes of separating and pulling out same. If the conductor elements terminate at the transverse connections, prior to the separating operation, the conductor structure can be formed in the form of a ladder or in a ladder-like manner with the transverse connections as rails and the conductor elements as rungs. A connection between the conductor elements and the transverse connections can be of fixed, in particular materially bonded, or reversibly releasable, for example force-fitting, design.

According to one embodiment, the conductor elements are separated in a central region of the conductor elements. In particular, a central tapering of the conductor elements can be provided for this purpose. The central tapering serves as a predetermined breaking point, with the result that the conductor elements are separated in the region of the tapering. The tapering may be a notch, for example. A notch of this kind may be provided in an encircling manner or merely on one side of the conductor element. Alternatively or additionally, it may be a continuous tapering, for example a one-dimensional tapering, such as a flattening, a two-dimensional tapering, such as a flattening and narrowing, or an encircling tapering, for example, a conical tapering. In addition to the function as a predetermined breaking point, the tapering can also be used to control the distribution of heat along the conductor elements. In particular, a central tapering makes it possible for a profile of the introduced ohmic heat to be designed in as uniform a manner as possible, since the ohmic resistance is also varied with the variation in the cross section. In this case, on account of the locally reduced cross section, the central tapering ensures a relatively high release of heat in a central region of the joining zone, which central region, on account of the heat conduction in the components, would otherwise be cooler than an edge region of the joining zone or would require a greater amount of time to heat up to a temperature that is suitable for welding. The tapering, in particular in the case of a notch, can furthermore also be used to bring about local pronounced heating by means of a current surge at the end of the welding operation, in order to thus assist the severing operation.

According to a further embodiment, the conductor elements are each separated in a region of abutment with one of the transverse connections. This advantageously permits a separation without fracture, for example by means of a coupling and separating arrangement based on a force fit and/or form fit, which is reversible. As a further advantage, all of the conductor elements can thus be pulled out in a common direction by way of application of a tensile force merely on the transverse connection lying opposite.

According to one embodiment, the conductor elements are coupled to one of the transverse connections in a force-fitting manner. The force fit is overcome during the separation. In particular, the force fit is overcome by the tensile force. The force fit can preferably be re-established in a reversible manner. In this way, the insert can advantageously be reused.

According to one embodiment, the transverse connections have a casing which contains a connection conductor and an insulating layer, wherein the tensile force is applied via the casing. The casing is thus a functionally integrated part which serves for supplying current, for insulation and for removing the insert. The insulating layer is, in particular, simultaneously designed for transmitting the tensile force, for example in the case of a manual application of the tensile force by means of a surface that can be readily gripped or in the case of a mechanical application of the tensile force by means of a suitable coupling point to a tensile actuator. The transverse connections can be coupled to the casing, in particular in a form-fitting manner. Alternatively, the casing can also form or constitute the transverse connection. In one embodiment, the casing can also additionally be configured in such a way that, during welding, it simultaneously also serves as a lateral melt bath support at the edge of the joining zone.

According to one embodiment, during the removal operation, a material of the thermoplastic components is above its melting temperature in the region of the joining zone. In particular, the material is the thermoplastic material or a thermoplastic matrix material of the components. In this way, consolidation is made possible after the pulling-out operation.

According to one embodiment, after the pulling-out operation, the components are pressed together at least in the region of the joining zone. Alternatively or additionally, during the melting operation, the components are pressed together. This serves for better transfer of heat into the material during the melting operation. After the pulling-out operation, a rapid volume compensation and a consolidation of the joining zone can be carried out by way of the external pressure.

According to one development, a pressure which presses the components together is removed or reduced during the separating and/or pulling-out operation(s). In this way, friction is reduced and a movement of the conductor elements relative to the molten material is facilitated.

According to one embodiment, the conductor elements are removed completely from the joining zone during the pulling-out operation. In this way, the strength of the joining zone is ensured in a long-lasting manner.

According to one embodiment, in addition to the insert, a welding filler material, in particular a thermoplastic film, is arranged in the joining zone, said filler material also being melted and/or being used to carry out a volume compensation during or after the pulling out of the conductor elements. In this way, the conductor elements can be easily pulled out after the melting operation. It is subsequently also possible for a materially bonded connection of the joining zone with high strength to be achieved.

According to one embodiment, in order to divide the joining zone into a plurality of joining portions, a plurality of inserts arranged alongside one another in a transverse direction are provided. Alternatively or additionally, the insert can be separated into a plurality of portions, in particular insulated portions, in the transverse direction. This can be effected, in particular, by way of separation of the transverse connections. In this way, sequential joining of the joining portions or —if there are enough energy sources available—also collective joining of all of the joining portions is made possible. Any desired length of the joining zone can thus be realized.

In one embodiment of an insert according to the invention, the parallel electrical conductor elements are configured in each case to be elongate and to be straight along a longitudinal direction. In this way, the collective application of the tensile force by way of the transverse connection is made possible. It is thus also possible for the conductor elements to be collectively pulled out of the joining zone in the longitudinal direction.

According to a further embodiment, the separation point comprises a central tapering of the conductor elements. In particular, said tapering may be a notch or a continuous tapering.

According to one embodiment, the conductor elements are coupled to one of the transverse connections in a force-fitting manner, wherein the force fit is designed to be able to be overcome by the tensile force. The insert can thus be separated in a simple, predetermined manner A reversibly releasable and connectable coupling is thus also provided, which makes it possible to reuse the insert.

According to a further embodiment, the transverse connections have a casing with a transverse conductor and an insulating layer, wherein the tensile force for separating and/or pulling out the conductor elements can be applied via the casing. The casing can be coupled to a transverse connection, for example coupled in a form-fitting manner, or can itself be provided as a transverse connection.

According to one embodiment, the transverse connections are designed so as to be able to be separated or divided in the transverse direction, and therefore the insert can be divided into a plurality of insulated portions. A length of the insert can thus be adapted freely.

According to a preferred embodiment, the conductor elements have an electrically insulating coating. In particular, the coating is configured for the sufficient and uniform transfer of heat into the joining zone.

According to one embodiment, the electrically insulating coating has an adhesion to the conductor elements which is provided so as to be higher than an adhesion to the thermoplastic material of the components. Peeling of the coating is thus avoided during the pulling-out operation.

According to one embodiment, the coating comprises a non-stick coating, and therefore no thermoplastic material is pulled out of the joining zone during the pulling-out operation. By way of example, a non-stick coating can be provided on the outer surface of an insulation for this purpose. In the case of a reversible separation, the non-stick coating can also be useful for facilitating cleaning for reuse of the conductor structure.

According to one embodiment, in the case of a force-fitting connection between the conductor element and the transverse connection, the coating is designed to support the mechanical closure or force-fit pressure. Reusability thus remains guaranteed.

The above refinements and developments may be combined with one another as desired where expedient. Further possible refinements, developments and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments shown in the schematic figures. In the figures.

Figure 1:
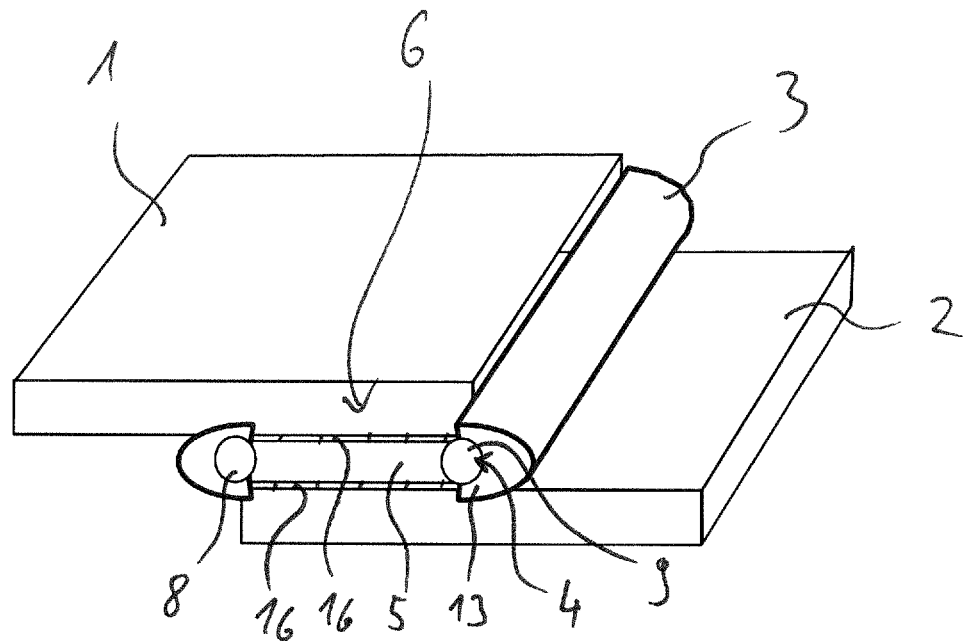
FIG. 1 shows a schematic perspective illustration of an insert arranged between two thermoplastic components.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

FIG. 1 shows a schematic perspective illustration of an insert 3 arranged between two components 1, 2.

In purely schematic form, the components 1, 2 are illustrated here in a square shape for illustration purposes. It goes without saying that further embodiments may also involve a variety of different component geometries, for example curved components or the like. It would, for example, be conceivable for structural parts of an aircraft or spacecraft, such as parts of an aircraft fuselage or the like, to be arranged for joining of same in this way.

The insert 3 has a conductor structure 4 having a multiplicity of parallel electrically conductive conductor elements 5. The conductor elements 5 are arranged in a joining zone 6 between the first thermoplastic component 1 and the second thermoplastic component 2 and are thus at least partially located in the joining zone 6.

In addition to the conductor elements 5, the conductor structure 4, at the two longitudinal ends of the conductor elements 5, has a respective transverse connection 8, 9 which is arranged outside or at the edge of the joining zone 6, the transverse connections being provided with an insulating casing 13. In the embodiment illustrated, the transverse connections 8, 9 are illustrated in purely schematic form with a round cross section. The respective casings 13 are illustrated in purely exemplary fashion with a semi-oval cross section. It goes without saying that very different cross-sectional shapes are possible and can be adapted to the component and abutment situation.

Moreover, here, in addition to the insert 3, a welding filler material 16 is arranged in the joining zone 6. The filler material can be a thermoplastic film, for example. A welding filler material of this kind is merely optional and may be provided or omitted, or provided in a different manner and a different quantity, depending on the nature of the materials to be joined and the geometry of the insert. By way of example, it would be conceivable for intermediate spaces provided between the conductor elements to be filled with the welding filler material. The welding filler material 16 can be provided in a variety of forms, besides films, for example also in block, wire, powder or granulate form.

Figure 2:
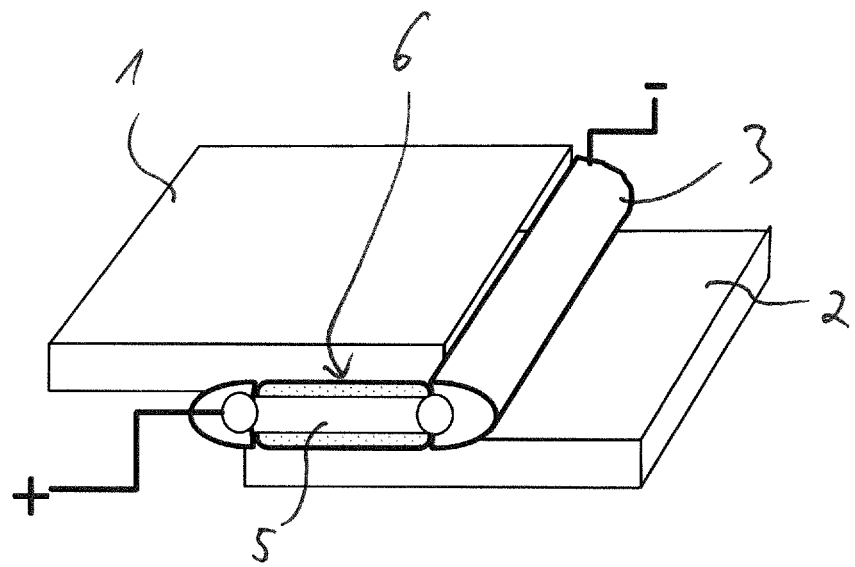
FIG. 2 shows the insert as per FIG. 1 with a current supply for welding the components.

FIG. 2 shows the insert 3 as per FIG. 1, inserted between the components 1, 2, with a current supply for welding the components 1, 2.

The current supply can be coupled, in particular, to a connection conductor which is integrated in the casing 13. The current supply, for example, involves a DC current and/or AC current source. By means of the current supply, it is thus possible for the insert to be used as a heat conduction element for the resistance welding of the components 1 and 2 as joining partners. Local melting of the components 1, 2 and their respective surfaces in the region of the joining zone 6 by means of the insert 3 produces a chemical or materially bonded connection between the components 1, 2. The heat required therefor is released directly in the joining zone 6 by means of electrical energy, which is converted by the electrical resistance of the conductor elements into thermal energy. The input of electrical energy may, in this case, be provided so as to be variable over the process. In this way, the components 1, 2 are melted locally in the region of the joining zone by way of energization of the insert 3, as illustrated here by the dotted region depicted around the conductor elements 5. In addition, the welding filler material 16 is also melted.

The conductor elements 5 have an electrically insulating coating which prevents any short circuits with any reinforcing fibers present in the components 1, 2. The coating is, at the same time, configured to be thin enough to permit a sufficient and uniform transfer of heat from the conductor element 5 into the joining zone 6.

Figure 3:
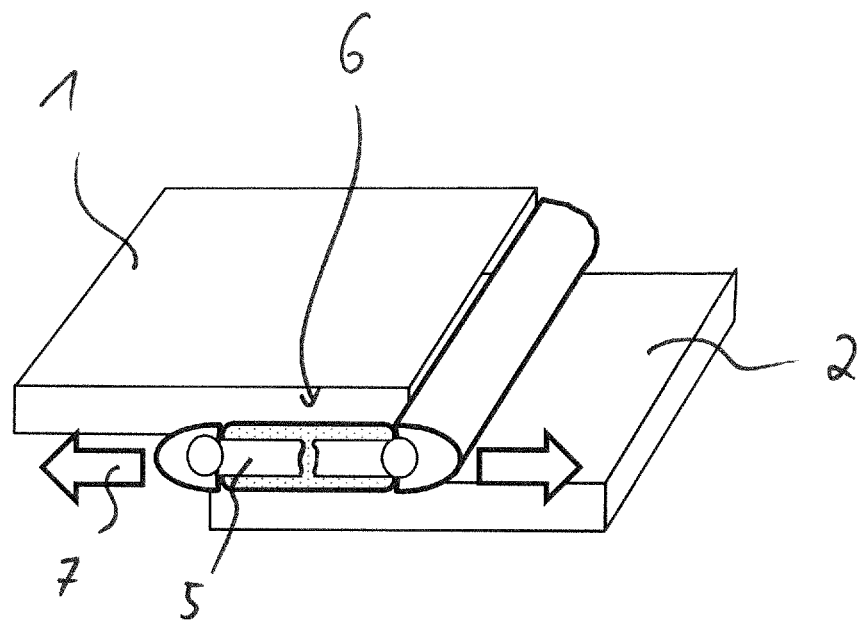
FIG. 3 shows the insert as per FIGS. 1 and 2 with separated conductor elements.

FIG. 3 shows the insert 3 as per FIGS. 1 and 2 with separated conductor elements 5.

The conductor elements 5 are separated by way of application of a tensile force 7, illustrated merely schematically here by arrows, to the conductor elements 5. The tensile force 7 is applied via the casing 13 of the transverse connections, for example. To this end, the tensile force can be applied to the casing 13 mechanically or manually.

The tensile force 7 leads to a severing of at least a portion of each of the conductor elements 5 from one of the transverse connections 8, 9. The portion of the conductor element 5 remains connected to the other one of the two transverse connections 8, 9. If the conductor elements 5 are separated by the tensile force 7, they can thus nevertheless be pulled laterally out of the joining zone 6. The conductor elements 5 are removed, preferably completely, from the joining zone 6 during the pulling-out operation.

In this way, the entire insert 3 is removed from the joining zone 6 by way of the pulling out of the separated conductor elements 5. As a result of the welding filler material 16, during the pulling out of the conductor elements 5, a volume compensation is carried out in the joining zone 6, such that inclusions do not occur.

During the removal of the insert 3, the material of the thermoplastic components 1, 2 or, in the case of fiber-reinforced components, the thermoplastic matrix thereof is above its melting temperature in the region of the joining zone 6, and therefore subsequent consolidation is made possible.

The insulating coating of the conductor elements 5 has an adhesion to the conductor elements which is provided so as to be higher than an adhesion to the thermoplastic material of the components 1, 2. Peeling of the coating is thus avoided during the pulling-out operation. The coating can also comprise a non-stick coating, and therefore no thermoplastic material is pulled out of the joining zone 6 during the pulling-out operation.

Figure 4:
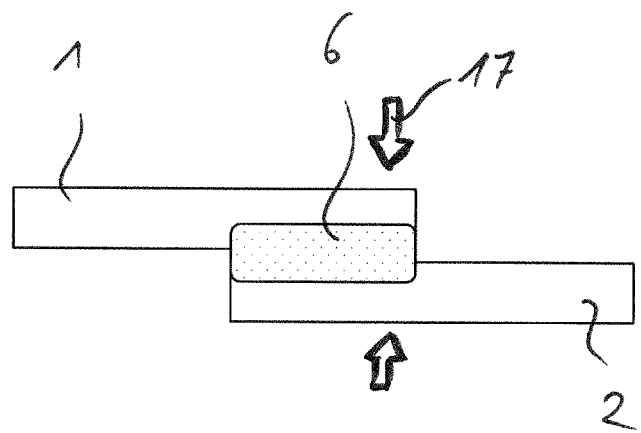
FIG. 4 shows a schematic sectional view of a consolidated joining zone after the pulling out of the conductor elements.

FIG. 4 shows a schematic sectional view of a consolidated joining zone 6 after the pulling out of the conductor elements 5.

For consolidation purposes, a pressure 17, illustrated schematically here by arrows, is exerted on the joining zone 6. It would also be conceivable for the joining zone 6 to undergo subsequent heating in order to relieve any internal stresses.

Furthermore, the components 1, 2 can also already be pressed together, at least in the region of the joining zone 6, during the melting operation. In this way, the heat conduction in the joining zone 6 is improved. However, the pressure 17 which presses the components 1, 2 together is removed or reduced during the separating and/or pulling-out operation(s), in order to reduce the friction and allow the conductor elements to be pulled out as far as possible without also pulling out molten material of the joining zone 6.

Figure 5:
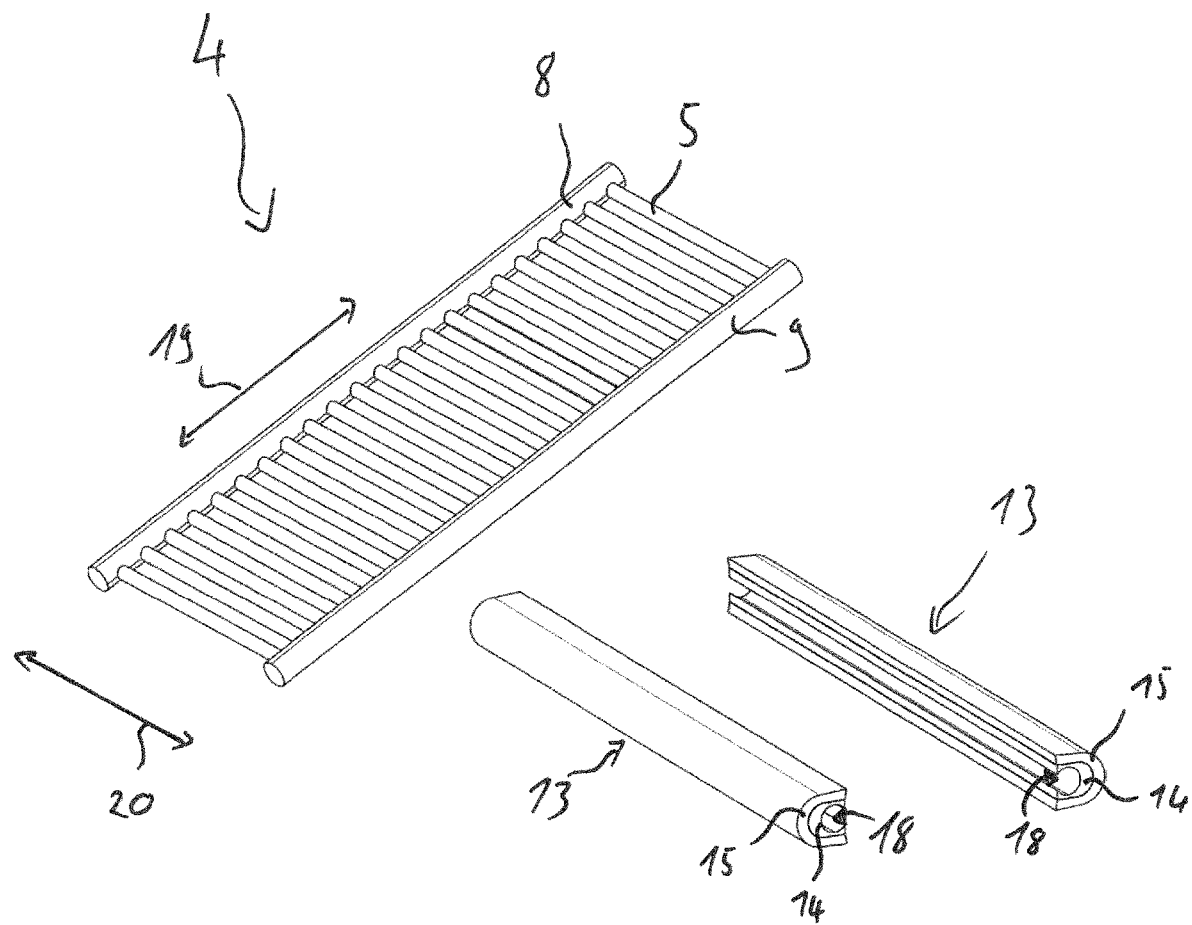
FIG. 5 shows a perspective illustration of the individual elements of an insert according to one embodiment.

FIG. 5 shows a perspective illustration of the individual elements of an insert according to one embodiment.

Here, the conductor structure 4 is illustrated separately from the casing 13. According to the embodiment illustrated, the conductor structure 4 has a first transverse connection 8 at a first longitudinal end and a second transverse connection 9 at a second longitudinal end of the conductor elements 5, each of the transverse connections being intended to be arranged outside or at the edge of the joining zone 6. The conductor elements 5 terminate at the transverse connections 8, 9, such that the electrical conductor structure 4 is configured in the form of a ladder or in a ladder-like manner with the transverse connections 8, 9 as rails and the conductor elements 5 as rungs.

A coupling between the conductor elements 5 and the transverse connections 8, 9 can be of fixed, in particular materially bonded, or reversibly releasable, for example force-fitting, design. In this way, it is possible, on the one hand, for the conductor elements 5 to be collectively energized and, also, for a collective tensile force to be applied to the conductor elements 5.

The transverse connections 8, 9 are likewise configured as conductors here. In order for heating in the region of the transverse connections 8, 9 to be avoided as far as possible, a significantly larger cross section is selected here than in the region of the conductor elements 5. The casings 13 additionally also provide a conductor cross section which can be coupled directly thereto.

To this end, the casings 13 each have a connection conductor 14 in addition to an outer insulating layer 15. The connection conductor extends over the entire length of the respective casing 13, that is to say, in the assembled state, parallel to the transverse connections 8, 9. Here, the connection conductors 14 are provided with a groove 18 which corresponds to the negative form of the transverse connection 8, 9 and in which the transverse connections 8, 9 can be received in a form-fitting manner. For assembly purposes, the casings 13 can thus be pushed laterally onto the transverse connections 8, 9.

In addition to insulation, the insulating layer 15 is also used to provide an area of action, suitable for the application of the tensile force 7, for either manual or mechanical pulling. As a result of the form fit with the connection conductor 14, the tensile force 7 is transmitted directly to the transverse connection 8, 9 and thus to the conductor elements 5.

The conductor elements 5 are configured, in each case, to be elongate and to be straight along a common longitudinal direction 20. In the embodiment illustrated, the conductor elements run perpendicular to the transverse connections 8, 9. The form-fitting reception of the transverse connections 8, 9 in the groove 18 transmits forces normal to the transverse direction 19. The application of the tensile force 7 and the pulling out of the conductor elements 5 are thus automatically performed in the longitudinal direction 20.

The conductor elements 5 also each have a predetermined separation point 11, which is configured for separation of the conductor element 5 as a result of a tensile force 7 which is applied to at least one of the transverse connections 8, 9.

Figure 6A:
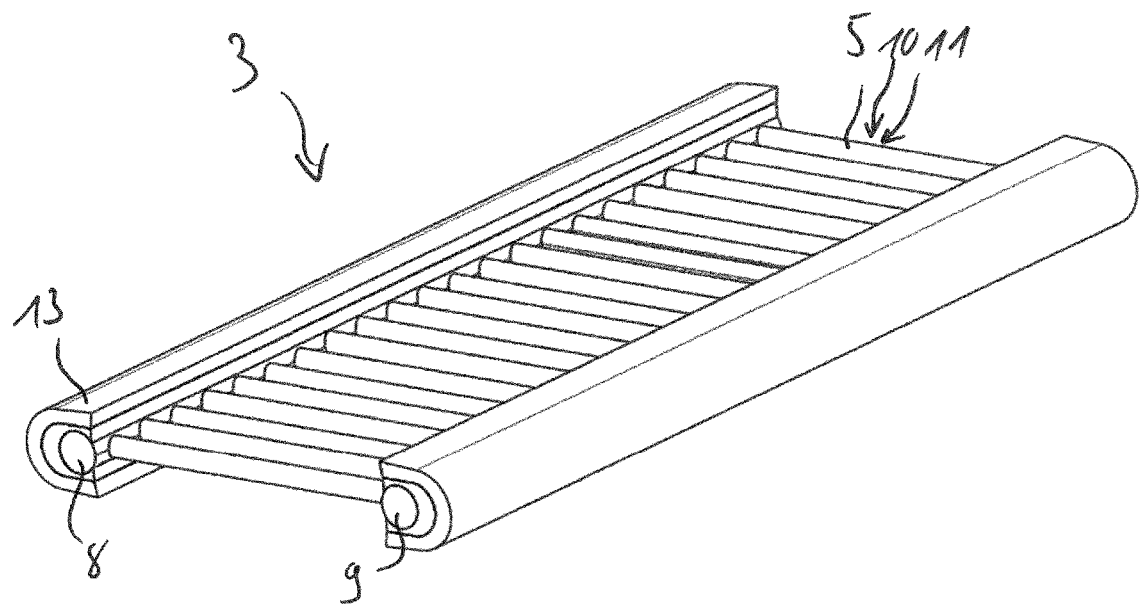
FIG. 6A shows a perspective illustration of an insert with a separation point in the central region of the conductor elements.

FIG. 6A shows a perspective illustration of an insert 3 with a separation point 11 in the central region 10 of the conductor elements 5.

The illustration shows an assembled insert 3, which has been constructed in the manner explained with reference to FIG. 5. The separation point 11 arranged in the central region 10 can, for example, be configured as a predetermined breaking point.

Figure 6B:
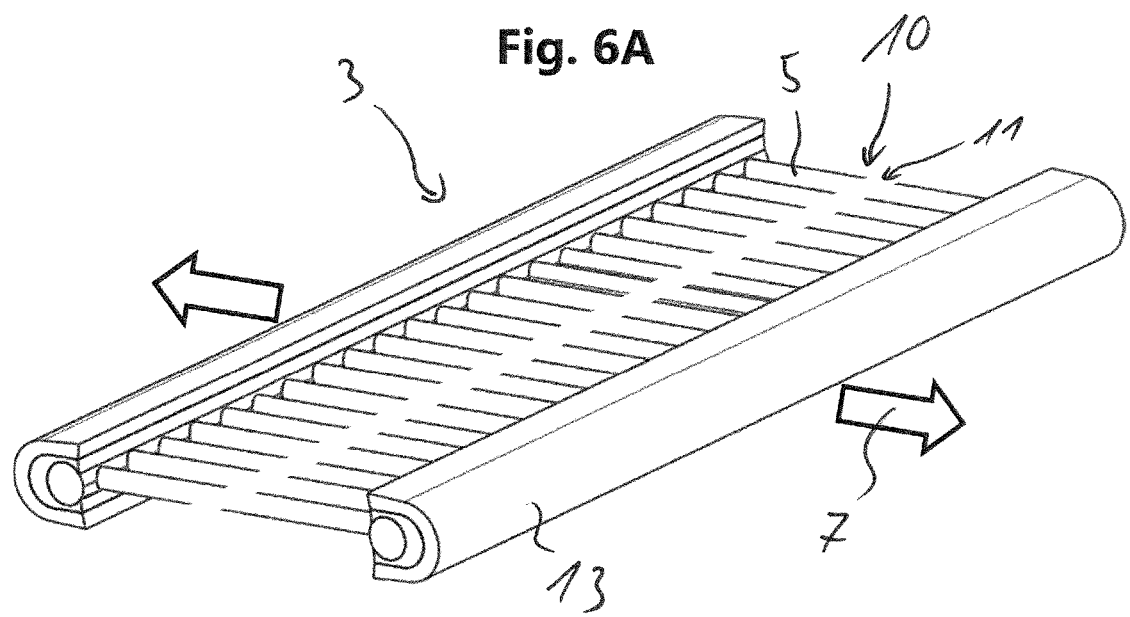
FIG. 6B shows the insert as per FIG. 6A with separated conductor elements.

FIG. 6B shows the insert 3 as per FIG. 6A with separated conductor elements 5.

The conductor elements 5 have all been separated equally at the separation point 11 arranged in the central region 10 by a tensile force 7 applied to the casing 13. This may, in particular, be an irreversible separation, for example a fracture of the conductor element 5 at a predetermined breaking point as separation point 11. In further embodiments, a reversible separation would also be conceivable, for example, with a plug-in connection as separation point 11.

Figure 7:
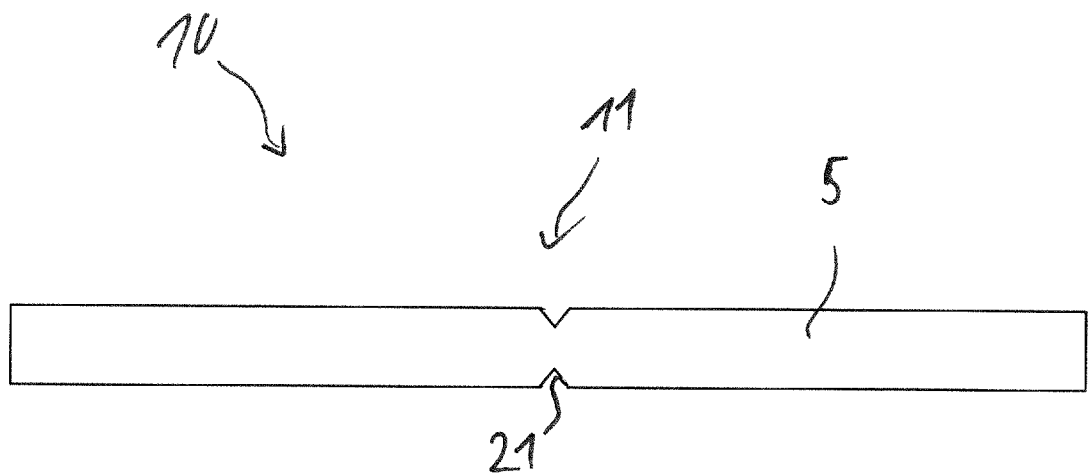
FIG. 7 shows a schematic sectional illustration of a central region of a conductor element according to one embodiment.

FIG. 7 shows a schematic sectional illustration of a central region 10 of a conductor element 5 according to one embodiment.

In this embodiment, the separation point 11 in the central region 10 has an encircling notch 21. A notch 21 of this kind functions as the beginning of a crack, and therefore when a tensile force is applied, a crack which ultimately leads to fracture propagates from the notch 21. In this way, a predetermined breaking point is provided.

Figure 8:
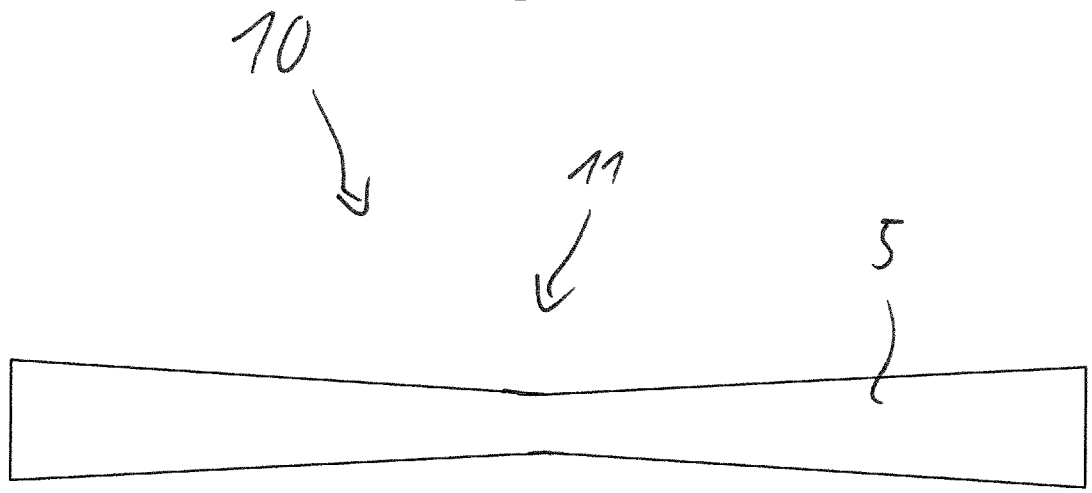
FIG. 8 shows a schematic illustration of a central region of a conductor element according to a further embodiment.

FIG. 8 shows a schematic illustration of a central region 10 of a conductor element 5 according to a further embodiment.

In this embodiment, the conductor element 5 conically tapers in the central region 10 continuously from both sides toward the center. A separation point 11 is thus provided in the region of a smallest cross section. When a tensile force is applied, the conductor element 5 constricts ever further with increasing tensile force in the region of this separation point until fracture occurs.

Furthermore, in the case of energization, a conductor element 5 of this kind also has a temperature profile which increases toward the center owing to the reducing cross section and thus increasing ohmic resistance, which is particularly advantageous for uniform heating of a joining zone 6.

Both in the embodiment according to FIG. 7 and in the embodiment according to FIG. 8, the conductor elements 5 are thus separated in the central region 10 of the conductor elements 5.

Figure 9A:
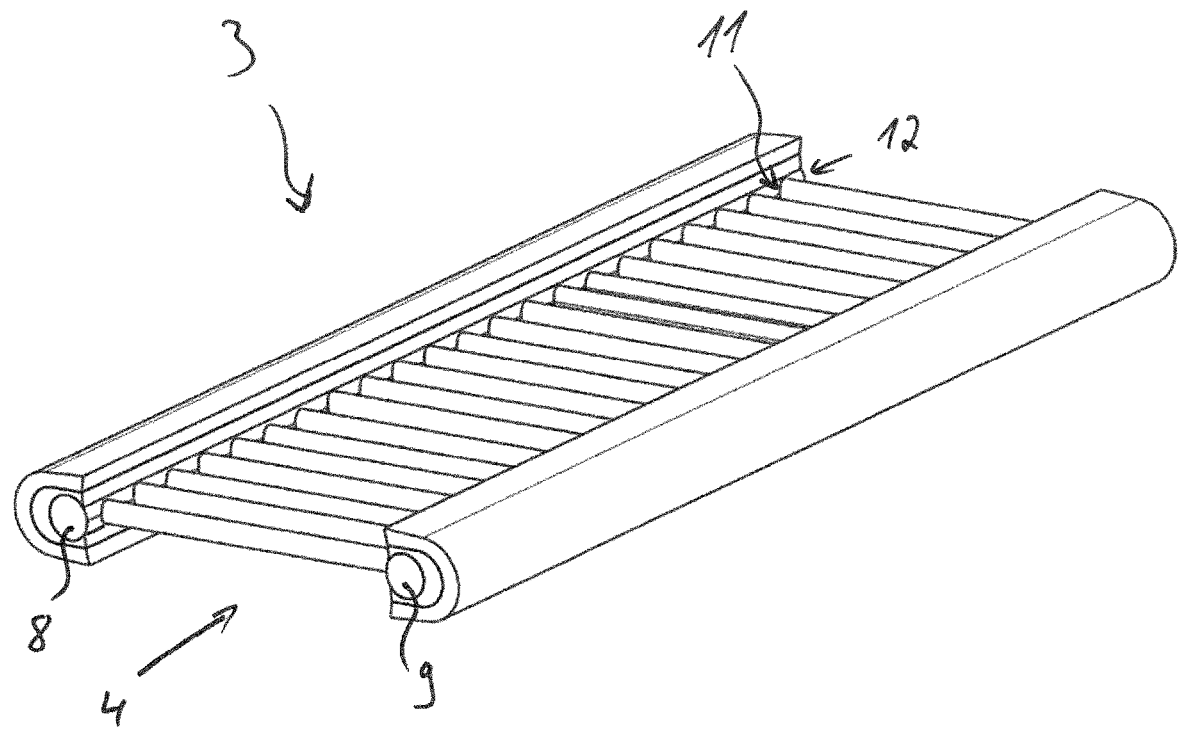
FIG. 9A shows a perspective illustration of an insert with a separation point in a region of abutment of the conductor elements with a transverse connection.

FIG. 9A shows a perspective illustration of an insert 3 with a separation point 11 in a region of abutment 12 of the conductor elements 5 with a transverse connection 8.

An arrangement of this kind is particularly advantageous if the conductor elements 5 are coupled to one of the transverse connections 8, 9 in a force-fitting manner and the force fit is overcome during the separation. By way of example, to this end, the separation point 11 can have a latching connection of the conductor elements 5 to the transverse connection 8. In this way, when the tensile force is applied, the conductor elements 5 are, in each case, separated from the transverse connections 8 in the abutment region 12.

Figure 9B:
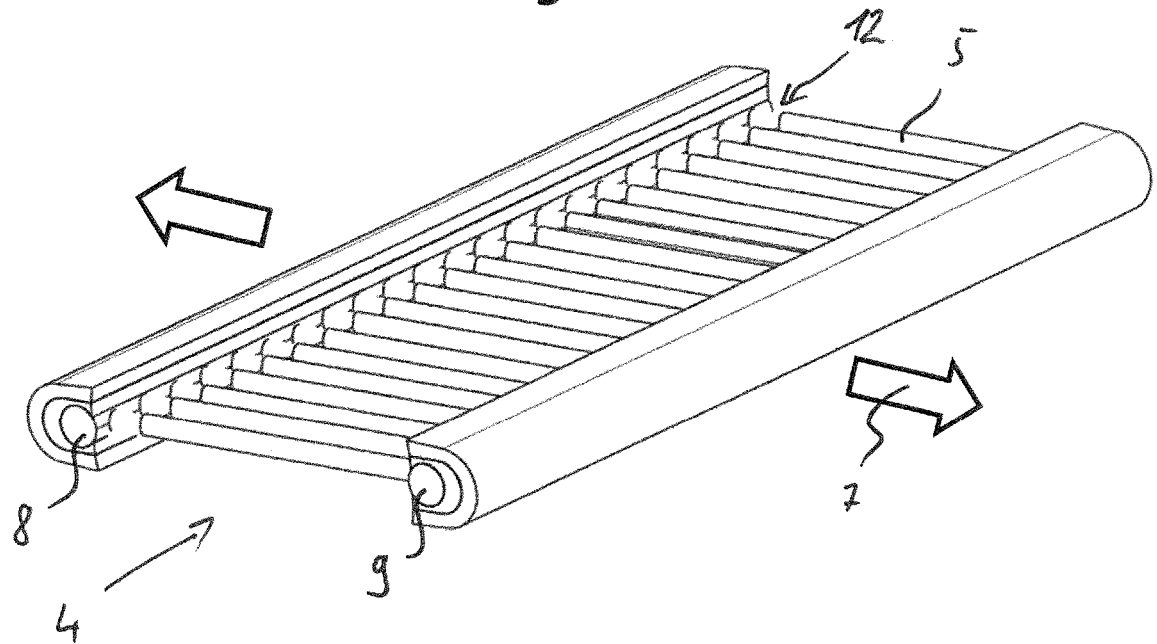
FIG. 9B shows the insert as per FIG. 9A with separated conductor elements.

FIG. 9B shows the insert as per FIG. 9A with separated conductor elements 5.

Here, the force-fitting connections have been released as a result of the tensile force 7, and therefore the conductor elements 5 are detached from the transverse connection 8 in the abutment region 12.

Here, an insulating coating of the conductor elements 5 is designed to support the mechanical closure or force-fit pressure. In conjunction with a non-stick property of the coating, cleaning for reuse of the force-fittingly connected conductor structure 4 is thus made possible.

Figure 10:
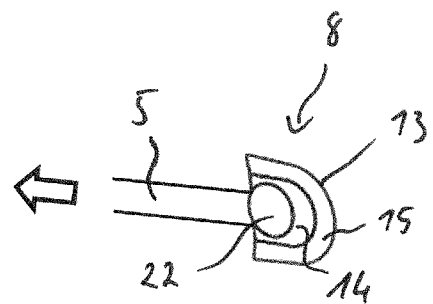
FIG. 10 shows a schematic illustration of a coupling of a conductor element to a transverse connection according to one embodiment.

FIG. 10 shows a schematic illustration of a coupling of a conductor element 5 to a transverse connection 8 according to one embodiment.

In this case, the transverse connection 8 is formed by the casing 13. Here, the conductor element 5 has a cylinder head or ball-shaped head 22 which is received in the groove 18 of the connection conductor 14 in a form-fitting manner. In this way, all of the conductor elements 5 can be threaded in the casing 13. Spacer elements introduced into the groove 18, for example, make it possible to ensure there is a uniform spacing for production of a parallel arrangement of the conductor elements 5. It goes without saying that, in further embodiments, it is also possible to provide differently formed individual receptacles for each conductor element 5 in the casing 13 functioning as a transverse connection 8.

Such an arrangement with an individual receptacle for each conductor element 5 in the transverse connection element 8 particularly advantageously facilitates a completely free and, in particular, also subsequently possible separability of the insert 3 in the transverse direction 19. In this way, the insert 3 can, for example, be cut to a desired length by way of separation of the transverse connection 8.

Figure 11:
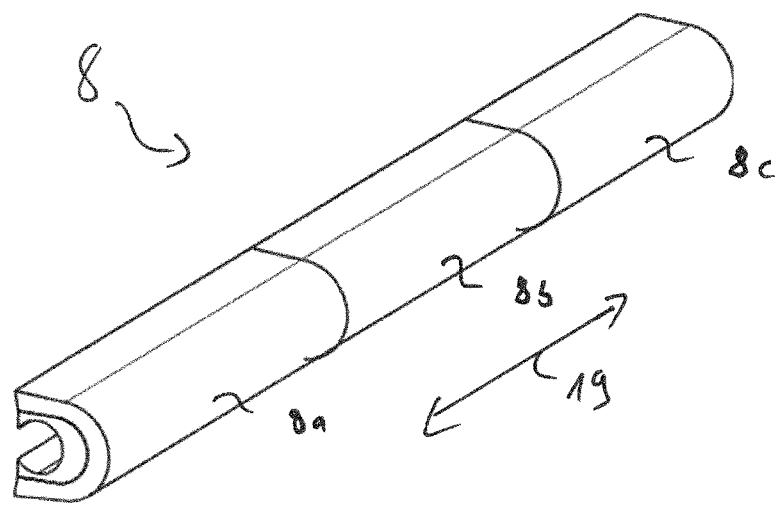
FIG. 11 shows a schematic illustration of separable regions of a transverse connection.

FIG. 11 shows a schematic illustration of separable segments 8a, 8b, 8c of a transverse connection 8.

In purely exemplary fashion, the transverse connection 8 is here separated into three segments 8a, 8b, 8c of equal size, which is made possible by simple cutting to length. It goes without saying that any other desired divisions or cut-to-length portions are possible. In this way, the segments 8a, 8b, 8c can be energized individually or independently of one another and, in particular, in a manner insulated from one another. Highly individual heating of different portions of a joining zone 6 is thus made possible, as required.

Figure 12:
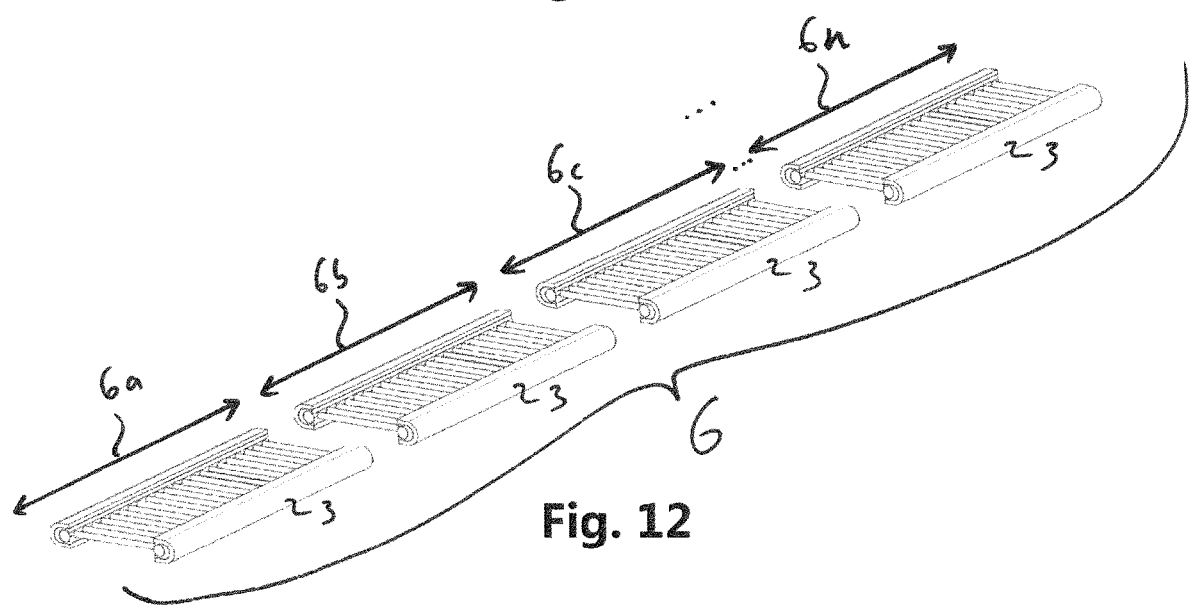
FIG. 12 shows a schematic illustration of a sequence of inserts in a common joining zone.

FIG. 12 shows a schematic illustration of a sequence of inserts 3 in a common joining zone 6.

To this end, a plurality of inserts, which are described with reference to FIGS. 5 to 9, can be arranged alongside one another in the transverse direction, and thus joining portions 6a, 6b, 6c, . . . , 6n can be formed. The joining portions can be energized either sequentially or simultaneously with a plurality of current sources. Any desired length of a joining zone 6 can thus be joined. The length of a joining zone 6 thus advantageously represents no limitation in the construction and design, which is particularly advantageous, in particular, in the case of large-area components, such as structural components of an aircraft or spacecraft.

Although the present invention has been described above entirely on the basis of preferred exemplary embodiments, the invention is not restricted to these but rather may be modified in a variety of ways. In particular, a variety of different cross-sectional shapes of the conductor elements are possible, for example flat or angular cross-sectional shapes in addition to round ones.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1 Component
2 Component
3 Insert
4 Conductor structure
5 Conductor element
6 Joining zone
7 Tensile force
8 Transverse connection
9 Transverse connection
10 Central region
11 Separation point
12 Abutment region
13 Casing
14 Connection conductor
15 Insulating layer
16 Welding filler material
17 Pressure
18 Groove
19 Transverse direction
20 Longitudinal direction
21 Notch
22 Cylinder head or ball-shaped head

The invention claimed is:

1. A method for welding thermoplastic components comprising the steps of:
arranging an insert, which has a conductor structure having a multiplicity of parallel electrical conductor elements, in a joining zone between a first thermoplastic component and a second thermoplastic component, such that the parallel electrical conductor elements are at least partially located in the joining zone;
locally melting the thermoplastic components in a region of the joining zone by energization of the conductor structure;
separating the parallel electrical conductor elements; and
removing the insert from the joining zone by pulling out the separated parallel electrical conductor elements,
wherein the conductor elements are separated in a central region of the parallel electrical conductor elements, and
wherein the parallel electrical conductor elements are separated in the central region which has a central tapering of the parallel electrical conductor elements.

2. The method as claimed in claim 1, wherein the conductor elements are separated by application of a tensile force to the conductor elements.

3. The method as claimed in claim 2, wherein the conductor elements are configured to be elongate and to be straight along a common longitudinal direction, wherein the application of the tensile force and the pulling-out step are performed in the longitudinal direction.

4. The method as claimed in claim 1, wherein the conductor structure, at two longitudinal ends of the parallel electrical conductor elements, has a respective transverse connection which is arranged outside or at the edge of the joining zone, wherein the separating step comprises severing at least a portion of each of the parallel electrical conductor elements from one of the transverse connections.

5. The method as claimed in claim 4, wherein the transverse connections have a casing which contains a connection conductor and an insulating layer, wherein a tensile force is applied via the casing.

6. The method as claimed in claim 1, wherein, during the removal step, a material of the thermoplastic components is above a melting temperature of the material in the region of the joining zone.

7. The method as claimed in claim 1, wherein, during at least one of the melting step or after the pulling-out step, the thermoplastic components are pressed together at least in the region of the joining zone.

8. The method as claimed in claim 7, wherein a pressure which presses the thermoplastic components together is removed or reduced during at least one of the separating or pulling-out steps.

9. The method as claimed in claim 1, wherein, in addition to the insert, a welding filler material, is arranged in the joining zone, said filler material also being at least one of melted or being used to carry out a volume compensation during the pulling out of the parallel electrical conductor elements.

10. The method as claimed in claim 9, wherein the welding filler material comprises a thermoplastic film.

11. The method as claimed in claim 4, wherein, in order to divide the joining zone into a plurality of joining portions, a plurality of inserts arranged alongside one another in a transverse direction are provided by separation of the transverse connections.

12. The method as claimed in claim 4, wherein, in order to divide the joining zone into a plurality of joining portions, the insert is separated into a plurality of portions in a transverse direction by separation of the transverse connections.

13. The method as claimed in claim 1, wherein the thermoplastic components comprise thermoplastic fiber composite structural components for an aircraft or spacecraft.

14. An insert for a resistance welding of thermoplastic components comprising:
   a multiplicity of parallel electrical conductor elements with a common longitudinal direction;
   a first transverse connection at a first longitudinal end and a second transverse connection at a second longitudinal end of the parallel electrical conductor elements; and
   a predetermined separation point on each parallel electrical conductor element, said separation point being configured for separation of the parallel electrical conductor element as a result of a tensile force which is applied to at least one of the transverse connections,
   wherein the predetermined separation points are in a central region of the parallel electrical conductor elements, and
   wherein the central regions have a central tapering of the parallel electrical conductor elements.

15. The insert as claimed in claim 14, wherein the parallel electrical conductor elements have at least one of an electrically insulating coating, which permits a transfer of heat, or comprises a non-stick coating.

16. The insert as claimed in claim 14, wherein the thermoplastic components comprise thermoplastic fiber composite structural components for an aircraft or spacecraft.

17. A method for welding thermoplastic components comprising the steps of:
   arranging an insert, which has a conductor structure having a multiplicity of parallel electrical conductor elements, in a joining zone between a first thermoplastic component and a second thermoplastic component, such that the parallel electrical conductor elements are at least partially located in the joining zone;
   locally melting the thermoplastic components in a region of the joining zone by energization of the conductor structure;
   separating the parallel electrical conductor elements; and
   removing the insert from the joining zone by pulling out the separated parallel electrical conductor elements,
   wherein the conductor structure, at two longitudinal ends of the parallel electrical conductor elements, has a respective transverse connection which is arranged outside or at the edge of the joining zone, wherein the separating step comprises severing at least a portion of each of the parallel electrical conductor elements from one of the transverse connections,
   wherein predetermined separation points on each parallel electrical conductor element are each in a region of abutment with one of the transverse connections, and,
   wherein the parallel electrical conductor elements are coupled to the one of the transverse connections in a force-fitting manner and a resulting force fit is overcome during the separation.

\* \* \* \* \*